(12) United States Patent
Fujisawa

(10) Patent No.: US 6,947,949 B2
(45) Date of Patent: Sep. 20, 2005

(54) APPARATUS AND METHOD FOR MANAGING APPLICATION IN INCORPORATED EQUIPMENT

(75) Inventor: Kunimasa Fujisawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 308 days.

(21) Appl. No.: 10/102,982

(22) Filed: Mar. 22, 2002

(65) Prior Publication Data

US 2002/0138666 A1 Sep. 26, 2002

(30) Foreign Application Priority Data

Mar. 26, 2001 (JP) ........................................ 2001-087577

(51) Int. Cl.$^7$ ............................................. G06F 17/30
(52) U.S. Cl. ....................... 707/103; 707/10; 717/108; 717/116; 717/175; 717/176; 719/315; 719/316
(58) Field of Search ..................... 707/10, 103, 101; 709/315, 316, 330, 332, 320, 219, 217, 203; 717/108, 116, 165, 175, 176, 177

(56) References Cited

U.S. PATENT DOCUMENTS

| 5,970,252 | A | * | 10/1999 | Buxton et al. | ............... 717/166 |
| 5,978,579 | A | * | 11/1999 | Buxton et al. | ............... 717/107 |
| 6,195,794 | B1 | * | 2/2001 | Buxton | ....................... 717/108 |
| 6,564,274 | B1 | * | 5/2003 | Heath et al. | ................. 710/105 |
| 2002/0065880 | A1 | * | 5/2002 | Hasegawa et al. | .......... 709/203 |
| 2003/0009538 | A1 | * | 1/2003 | Shah et al. | .................. 709/219 |

FOREIGN PATENT DOCUMENTS

JP 2000-250758 9/2000

* cited by examiner

Primary Examiner—Jean M. Corrielus
(74) Attorney, Agent, or Firm—Fitzpatrick, Cella, Harper & Scinto (57) ABSTRACT

The present invention provides an application managing apparatus and an application managing method, in which, after an incorporated equipment such as a copying machine, a printer, a multi function printer (MFP) having copier, printer and facsimile functions and a digital camera is forwarded, it is possible to install the program into the incorporated equipment and to start the installed program. When a name of a service to be installed and program data of the service are sent from a web browser to an install servlet as installation instruction of a program by HTTP protocol, the install servlet stores the program data in an external storing device as a file and registers a path storing the program and the service name in a class path management portion.

14 Claims, 12 Drawing Sheets

CLASS PATH INFORMATION MANAGEMENT PORTION
202

| Service A | Applets/ServiceA/a.jar |
| Service B | Applets/ServiceB/a.jar |
| Service C | Applets/ServiceC/a.jar |
| ⋮ | ⋮ |

FIG. 4

CLASS LOADER MANAGEMENT PORTION
203

| Service A | CLASS LOADER OBJECT OF Service A |
| Service B | CLASS LOADER OBJECT OF Service B |
| Service C | CLASS LOADER OBJECT OF Service C |
| ⋮ | ⋮ |

APPARATUS AND METHOD FOR MANAGING APPLICATION IN INCORPORATED EQUIPMENT

BACKGROUND OF THE INVENTION

1. Field of the Invention

The present invention relates to apparatus and method for managing application and, a storing medium and a program, and more particularly, it relates to apparatus and method for managing application and, a storing medium and a program, which are suitable for executing an application program on an incorporated equipment such as a copying machine, a printer, a multi function printer (MFP) having copier, printer and facsimile functions and a digital camera.

2. Related Background Art

In recent years, processors, memories and display devices mounted to incorporated equipments have been designed to have a high function and a large capacity. Further, in the incorporated equipment (for example, even in a copying machine), a multi function printer which is used not only merely as a copier but also as a printer or a facsimile has mainly be utilized.

The incorporated equipment as mentioned above includes a display device such as a liquid crystal display having a certain degree of resolving power so that an application program which is used by the operator to carry out various functions can be executed. However, since such an application program is fixedly written in a ROM, the operator cannot easily exchange or alter the application program.

For example, as disclosed in Japanese Patent Application Laid-open No. 2000-250758 (corresponding to U.S application Ser. No. 259,616 filed on Mar. 1, 1999), application manager "Java" (trade mark) for an incorporated equipment has been proposed by Hylet Packard Inc. In a technique described in this Application, a class loader for developing and managing class of the "Java" program to be operated (one unit of the program in "Java") on a memory is not prepared for each of the Java programs, if there is different class having the same name in the Java program formed by the user or a third party, a Java virtual machine cannot judge which class should be executed, so that a plurality of Java programs cannot be executed.

However, in the above-mentioned conventional technique, there arise the following problems. That is to say, as mentioned above, since the application program for the incorporated equipment is fixedly written in the ROM, it is impossible to easily exchange or alter the application by the operator, and, if any trouble occurs, the application program can be corrected only by a method in which the ROM is exchanged by an expert.

Further, when a plurality of incorporated equipments are used by the operator, the application program cannot be executed until the operator reaches and utilizes an incorporated equipment capable of installing a given operator's application program, so that the management is difficult and troublesome.

Further, although the conventional application program for the incorporated equipment is risen-up upon start of the incorporated equipment, in the incorporated equipment capable of installing the application program, it is necessary to start and stop the installed application program, since such application program is a problem regarding the resource of the incorporated equipment, so that the program is not required to always be operated, and in many cases, the program is needed under a particular condition or only when it is used by the operator.

On the other hand, in an equipment such as the incorporated equipment having limited resource, it is difficult to operate the plurality of Java virtual machines, since, although the Java virtual machine requires a high speed processor and a large capacity memory, many of incorporated equipments do not have such a high speed processor and a large capacity memory.

Further, depending upon an operating system for controlling the incorporated equipment, the same program cannot be executed by plural times or the program once started cannot be stopped or the program cannot be re-started after it is stopped. In such equipment, one Java virtual machine is started whenever one Java program is risen up, and, even when the started Java program becomes useless, the useless Java virtual machine continues to operate until the power supply of the equipment is turned OFF.

To avoid this, it is necessary to provide application managing means for operating the plurality of Java application programs by a single VM (virtual machine). When the plural Java application programs are executed on the single VM, a certain Java application program must effect installation, start, stop and uninstallation of other Java application programs without affecting an influence upon the operation.

Further, when the program can easily be installed into the incorporated equipment, there arises a problem that class names of the Java programs formed by the operator or the third party may be interfered with each other.

SUMMARY OF THE INVENTION

The present invention is made in consideration of the above-mentioned conventional problems, and a first object of the present invention is to provide apparatus and method for managing application, and a storing medium and a program, in which, after an incorporated equipment such as a copying machine, a printer, a multi function printer (MFP) having copier, printer and facsimile functions and a digital camera is forwarded, the program can be installed into the incorporated equipment and/or installed program can be started.

Further, the present invention is made in consideration of the above-mentioned conventional problems, and a second object of the present invention is to provide apparatus and method for managing application, and a storing medium and a program, in which a memory of an incorporated equipment can be saved by deleting a class loader of a program not used from the memory.

Further, the present invention is made in consideration of the above-mentioned conventional problems, and a third object of the present invention is to provide apparatus and method for managing application, and a storing medium and a program, in which installation, start, stop and uninstallation of a program itself for effecting installation, start, stop and uninstallation can easily be executed.

To achieve the above objects, an application managing apparatus for managing application operating on a virtual machine according to the present invention in an equipment comprises storing means for storing information regarding a program file of the application, network connecting means for effecting communication to a client, and registration control means for storing the program file in an external storing device and for registering positional information of the program file in the storing means when the program file is sent from the client through the network connecting means.

Further, an application managing apparatus for managing application operating on a virtual machine according to the present invention in an equipment comprises registration means for registering a class loader of the application, storing means for storing a storing location of a program file of the application, network connecting means for effecting communication to a client, and start means for forming a class loader for the application, starting the application, registering the formed class loader in the registration means and loading the class by means of the formed class loader when start instruction for the application is sent from the client through the network connecting means and if the class loader for the start-instructed application is not registered in the registration means, and for obtaining the class loader registered in the registration means, loading the class by means of the obtained class loader and starting the application if the class loader for the start-instructed application is registered in the registration means.

Further, an application managing method for managing application operating on a virtual machine according to the present invention in an equipment comprises a step for storing information regarding a program file of the application, and a registration control step for storing the program file in an external storing device and for registering positional information of the program file in the storing means when the program file is sent from a client through network connecting means.

Further, an application managing method for managing application operating on a virtual machine according to the present invention in an equipment comprises a registration step for registering a class loader of the application in registration means, a storing step for storing a storing location of a program file of the application in storing means, and a starting step for forming a class loader for the application, starting the application, registering the formed class loader in the registration means and loading the class by means of the formed class loader when start instruction for the application is sent from a client through network connecting means and if the class loader for the start-instructed application is not registered in the registration means, and for obtaining the class loader registered in the registration means, loading the class by means of the obtained class loader and starting the application if the class loader for the start-instructed application is registered in the registration means.

DETAILED DESCRIPTION OF THE PREFERRED EMBODIMENTS

First of all, prior to explanation of embodiments of the present invention, summary of the present invention will be described.

A Java virtual machine used in the present invention is a virtual machine for executing a program described by Java languages developed by Sun MicroSystems, Inc. By using an application management program (referred to as "server manager" hereinafter) for managing operations of plural applications (referred to as "services" hereinafter) operating on the Java virtual machine, an HTTP server service as a web server operating on the application management program, and an install servlet and a control servlet operating an servlet as one form of a Java program operating on the HTTP server service, it is possible to easily add a program, to operate the program and to delete the program without affecting an influence upon execution of other Java applications being executed on an equipment such as an incorporated equipment after the equipment was forwarded, by installing the service into the equipment from a remote web browser, starting the service and/or stopping the service.

Further, by forming and managing a class loader for each service prepared in the Java in order to read class data as a unit of program data for individual service from a disk and to manage the read class data, increase of vacant memory can easily be realized by avoiding interference between service class names or by deleting the class loader from the memory.

Now, first to fourth embodiments of the present invention will be fully explained with reference to the accompanying drawings.

(First Embodiment)

Figure 1:
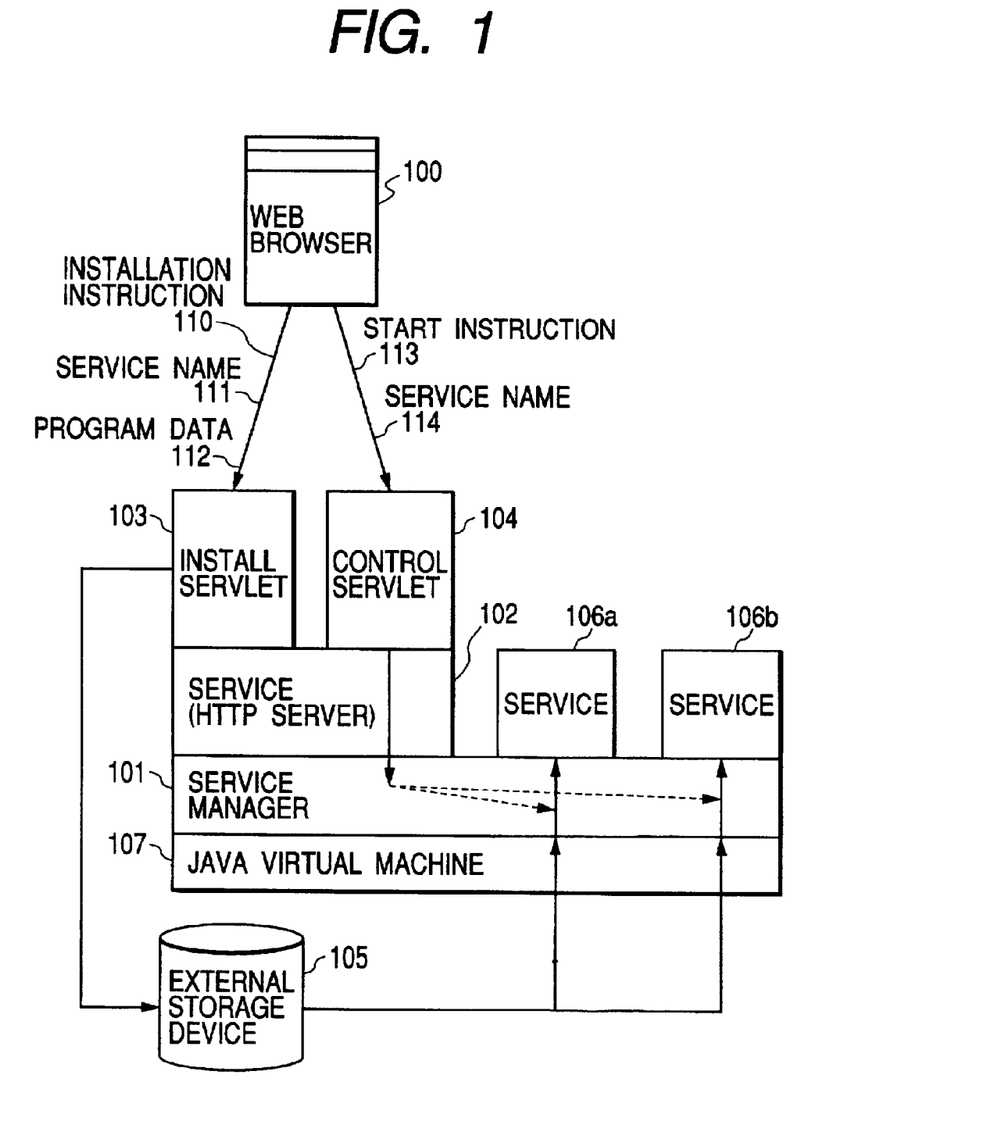
FIG. 1 is a block diagram showing a construction of an application managing system according to first and second embodiments of the present invention.

FIG. 1 is a block diagram showing a construction of an application managing system according to a first embodiment of the present invention. The application management system comprises a Java virtual machine 107, a web browser 100 arranged at a user side where installation of Java application (referred to as "service" hereinafter) is effected, a service manager 101 for managing the service, an HTTP (HyperText Transfer Protocol) server 102 executed as service on the service manager 101, an install servlet 103 formed in the form of servlet as one style of a Java program executed on the HTTP server 102 and operating on the HTTP server 102 and adapted to effect installation processing, and an external storing device 105 in which the program to be installed is stored. The reference numerals 106a and 106b denote services. Incidentally, the reference numeral 104 denotes a constructional element in a second embodiment of the present invention.

Figure 2:
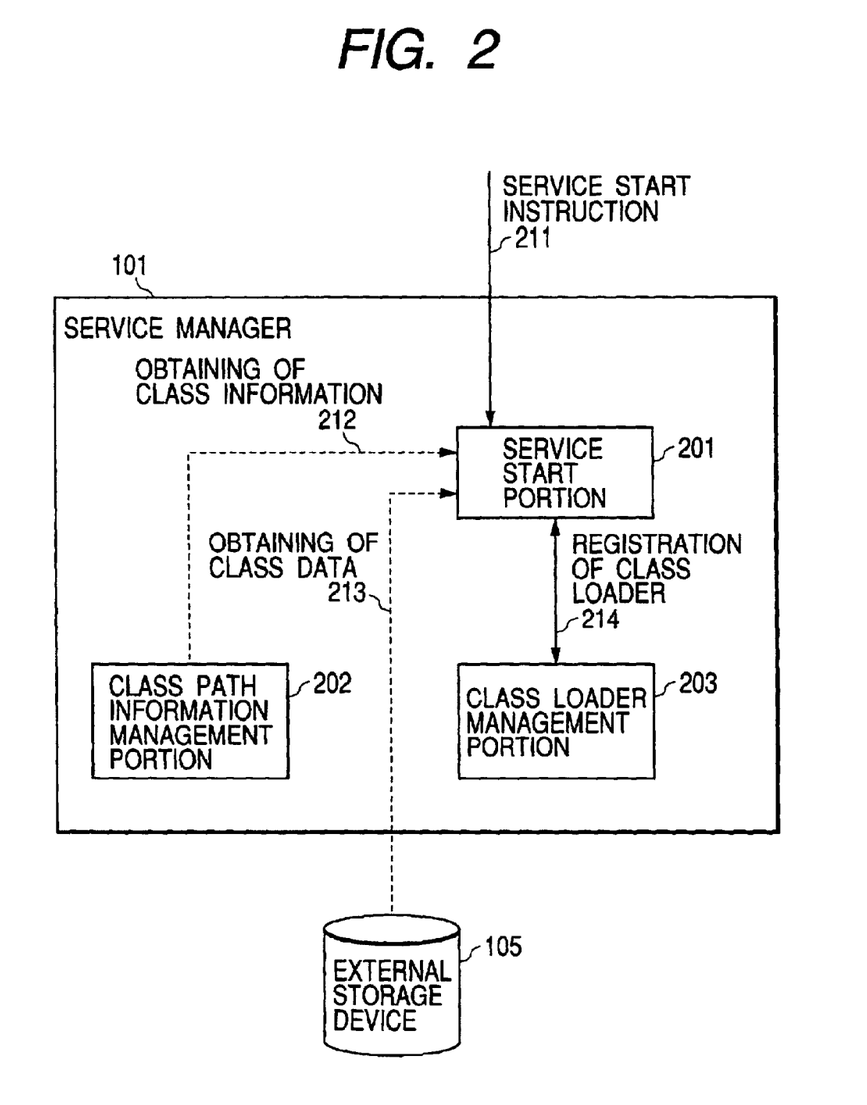
FIG. 2 is a block diagram showing a construction of a server manager according to the first and second embodiments.

FIG. 2 is a block diagram showing the service manager 101 according to the first embodiment of the present invention. The service manager 101 includes a class path information management portion 202 for storing a pair comprised of a name of the service installed and a path information in which a program file of the service is stored. Incidentally, the reference numerals 201 and 203 denote constructional elements of the second embodiment.

Figure 3:
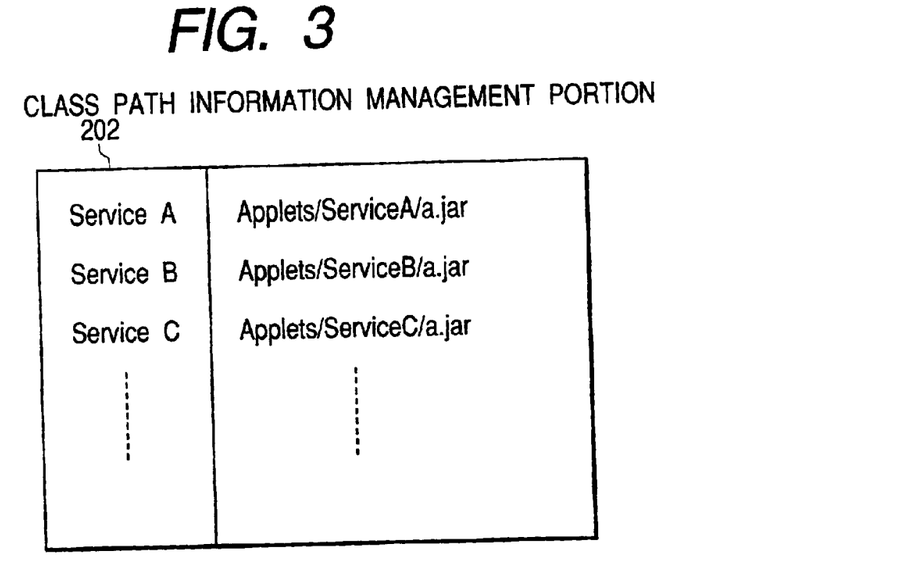
FIG. 3 is an explanatory view showing a construction of a class path information management portion according to the first and second embodiments.

FIG. 3 is an explanatory view showing a construction of the class path information management portion 202 according to the first embodiment of the present invention. As mentioned above, the pair comprised of the service name and the path information is stored in the class path information management portion 202.

Next, an operation of the first embodiment of the present invention constructed as mentioned above will be fully explained with reference to FIGS. 1, 5 and 11.

Figure 5:
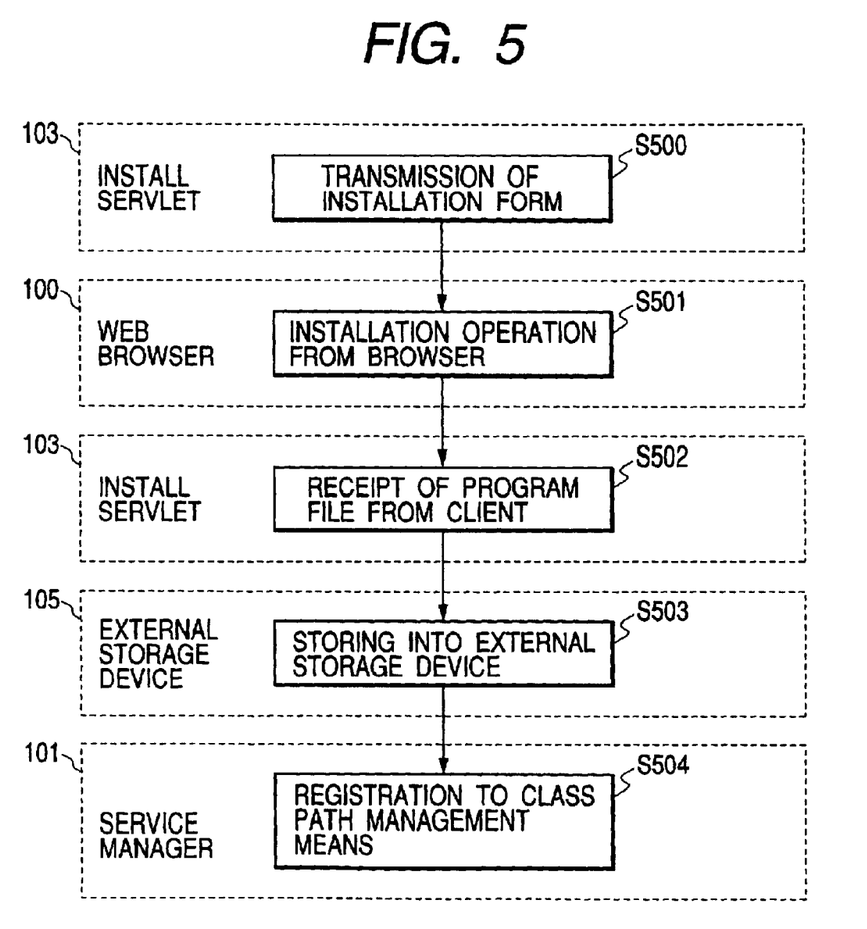
FIG. 5 is a flow chart showing installation processing according to the first embodiment.
Figure 11:
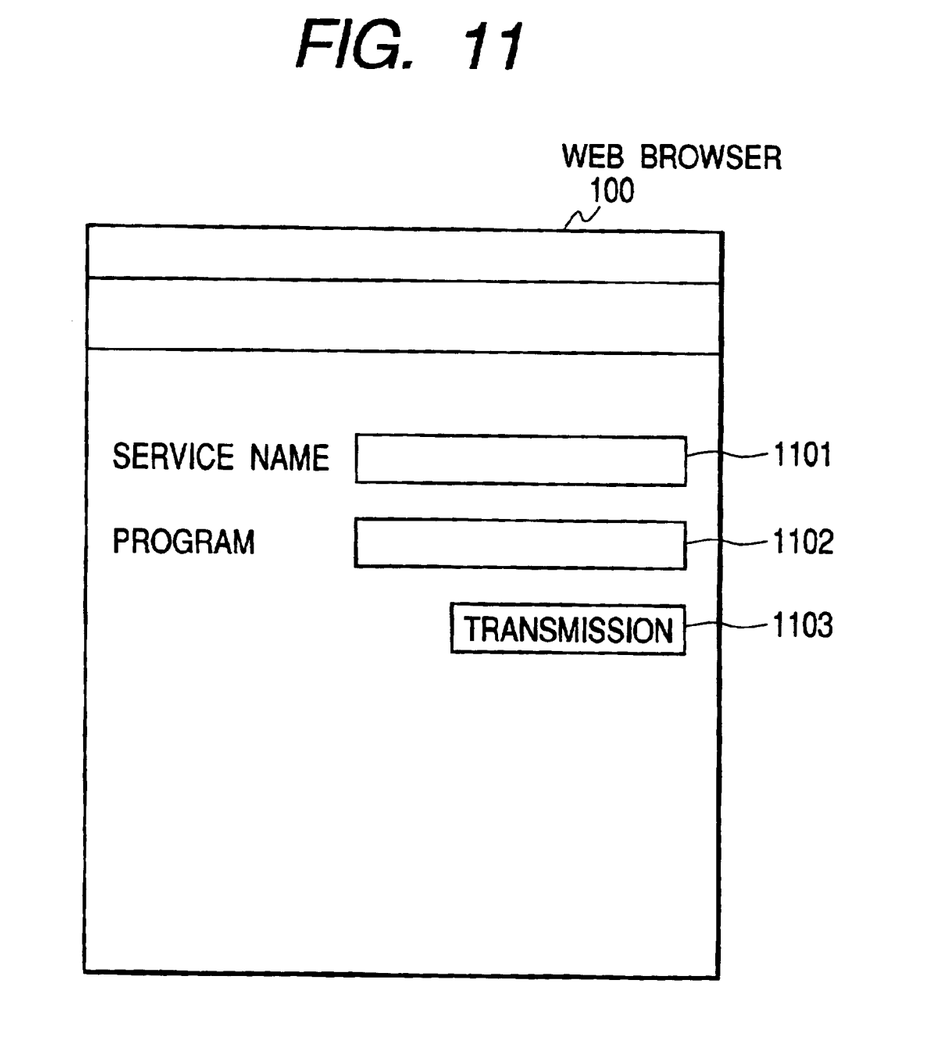
FIG. 11 is an explanatory view showing a service installation screen according to the first embodiment.

First of all, as shown in FIG. 5, the install servlet 103 operating on the HTTP server 102 which is one of services operating on the service manager 101 and adapted to effect the installation of the service serves to send form data comprised of a column 1101 for inputting the name 111 of the service, a column 1102 for inputting the path at a side of the web browser of the program data of the service and a transfer button 1103, on the basis of request from the web browser 100 (step S500), as shown in FIG. 11.

In the web browser 100, when the operator inputs the service name 111 and the path at the side of the web browser to the form and depresses the transfer button 1103, in accordance with specification of the form defined by HTML (HyperText Markup Language), the service name 111 to be installed and the program data 112 of the service are transferred from the web browser 100 to the install servlet 103 as installation instruction 110 of the program by HTTP protocol (step S501).

When the install servlet 103 receives the program data 112 sent from the web browser 100 (step S502), the install servlet stores the program data 112 in the external storing device 105 as a file (step S503) and further registers the pass storing the program and the service name 111 in the class path management portion 202 (step S504).

As mentioned above, according to the first embodiment of the present invention, by providing the service manager 101 as the application management program for managing the operations of the plural Java applications (services) operating on the Java virtual machine 107, the HTTP server 102 as the web server operating on the service manager 101, and the install servlet 103 operated as the servlet as one form of the Java program operating on the HTTP server 102, it is possible to easily add, operate or delete a program after the equipment is forwarded, without affecting execution of other Java applications executed in the equipment such as the incorporated equipment, by installing the service into the equipment from a remote web browser 100, starting the service or stopping the service.

Further, by forming and managing the class loader for each service prepared in the Java in order to read the class data as the unit of the program data for individual service from the disk and to manage the read class data, increase of a vacant memory can easily be realized by avoiding interference between the service class names or by deleting the class loader from the memory.

That is to say, after the incorporated equipment such as a copying machine, a printer, a multi function printer (MFP) having copier, printer and facsimile functions and a digital camera is forwarded, it is possible to install the program into the incorporated equipment and to start the installed program. Further, by deleting a class loader of a program which is not used, from the memory, the memory of the incorporated equipment can be saved. Furthermore, since the program for effecting the installation, start/stop and uninstallation is a program operating on the application management program, installation, start/stop and uninstallation of the program itself for effecting the installation, start/stop and uninstallation can easily be performed.

(Second Embodiment)

FIG. 1 is a block diagram showing a construction of an application managing system according to a second embodiment of the present invention. The application management system comprises a Java virtual machine 107, a web browser 100 arranged at a user side where installation of Java application (referred to as "service" hereinafter) is effected, a service manager 101 for managing the service, an HTTP server 102 executed as service on the service manager 101, an control servlet 104 formed in the form of servlet as one style of a Java program executed on the HTTP server 102 and operating on the HTTP server 102 and adapted to effect start/stop processing of the service, and an external storing device 105 in which the program to be installed is stored. The reference numerals 106a and 106b denote services. Incidentally, the reference numeral 103 denotes the constructural element in the first embodiment.

FIG. 2 is a block diagram showing the service manager 101 according to the second embodiment of the present invention. The service manager 101 includes a service start portion 201 for effecting start/stop of the service, a class path information management portion 202 for storing a pair comprised of a name of the service installed and a path information in which a program file of the service is stored, and a class loader management portion 203 for storing a pair comprised of the service name and a class loader (for the started service) formed in the service start portion 201 when the service is started.

Figure 4:
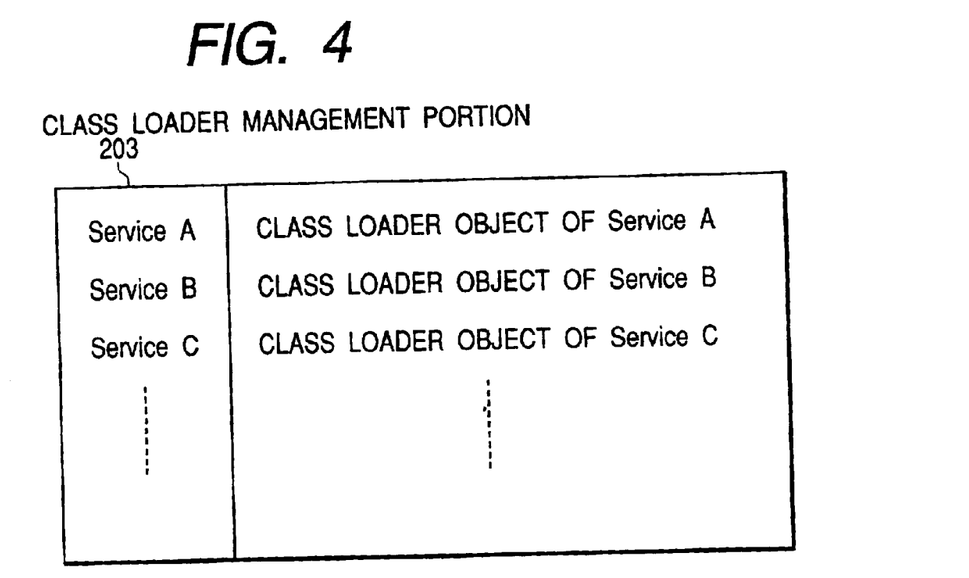
FIG. 4 is an explanatory view showing a construction of a class loader management portion according to the second embodiment.

FIG. 3 is an explanatory view showing a construction of the class path information management portion 202 according to the second embodiment of the present invention, and FIG. 4 is an explanatory view showing a construction of the class loader management portion 203 according to the second embodiment of the present invention. As mentioned above, the pair comprised of the service name and the path information is stored in the class path information management portion 202, and the pair comprised of the service name and the class loader is stored in the class loader management portion 203.

Next, an operation of the second embodiment of the present invention constructed as mentioned above will be fully explained with reference to FIGS. 1, 6 and 12.

Figure 6:
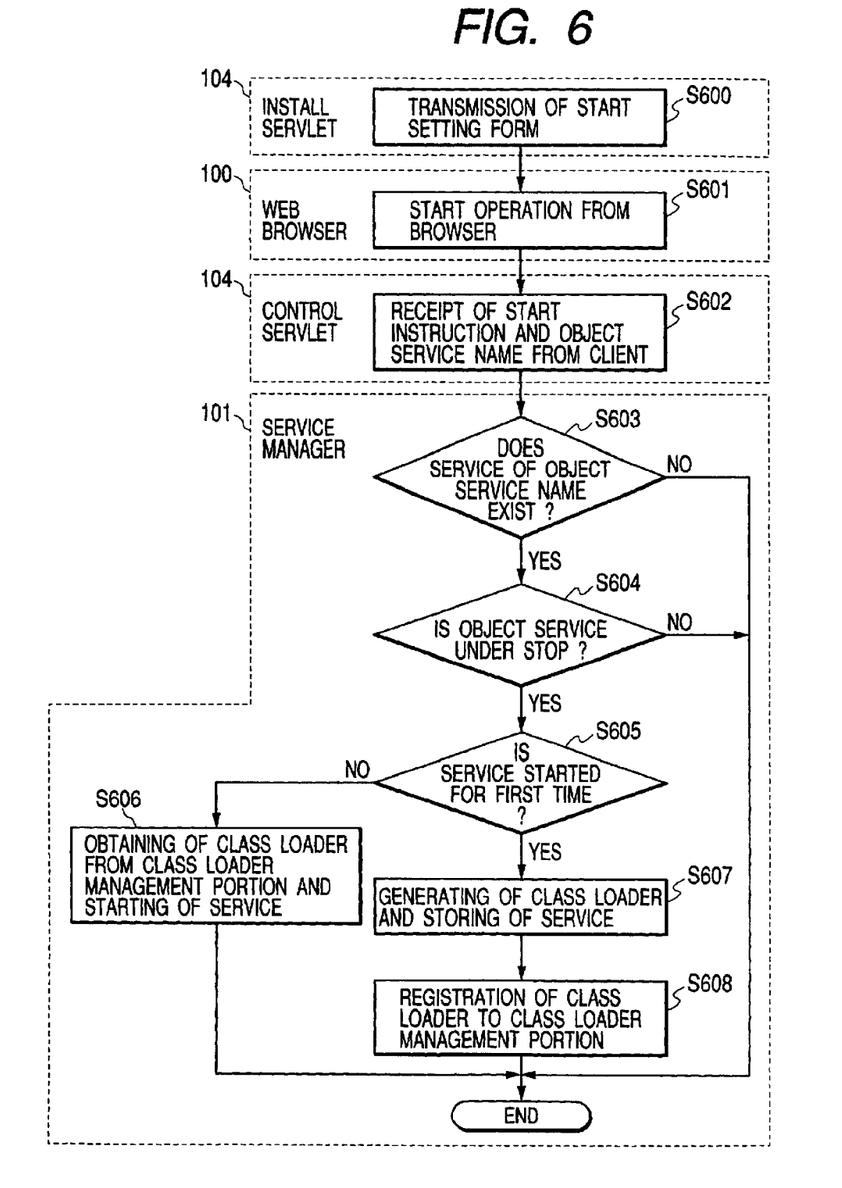
FIG. 6 is a flow chart showing start processing according to the second embodiment.
Figure 12:
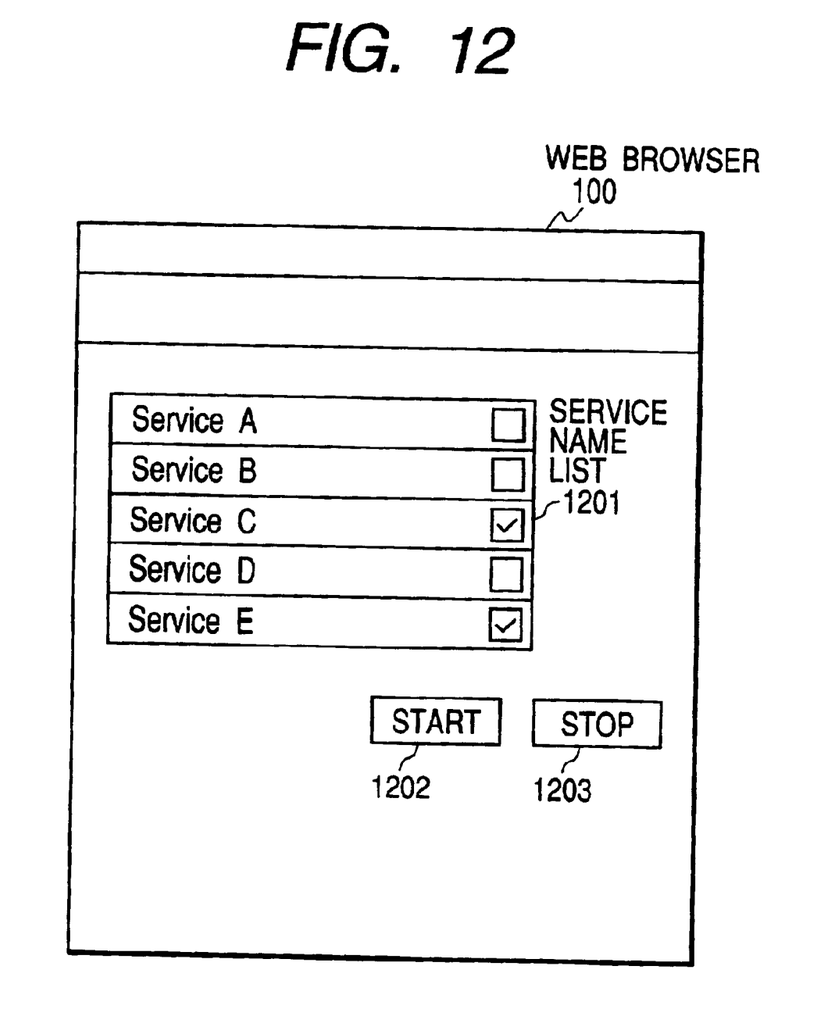
FIG. 12 is an explanatory view showing a service start/stop screen according to the second embodiment.

First of all, as shown in FIG. 6, the control servlet 104 operating on the HTTP server 102 which is one of service operating on the service manager 101 and adapted to effect the installation of the service serves to send form data including a service name list 1201 comprised of the service name and a check box, a start button 1202 and a stop button 1203, on the basis of request from the web browser 100 (step S600), as shown in FIG. 12.

In the web browser 100, when the operator checks the check box of the service which is desired to be started by using the service name list 1201 of the form and depresses the start button 1202, in accordance with specification of the form defined by HTML, the service name 114 to be installed is transferred from the web browser 100 to the control servlet 104 as start instruction 113 of the program by HTTP protocol (step S601).

Further, when the service name 114 to be installed is transferred from the web browser 100 to the control servlet 104 as the start instruction 113 of the program (step S601), the control servlet 104 receives the service name 114 (to be started) sent from the web browser 100 (step S602) and outputs start instruction to the service manager 101.

When the service start portion 201 of the service manager 101 receives the start instruction from the control servlet 104, the service start portion firstly checks whether the service name 114 is registered in the class path information management portion 202 (step S603). If there is no object service in the class path information management portion 202, the processing is ended. On the other hand, if there is the object service in the class path information management portion 202, then, it is checked whether the object service is stopped or not (step S604). If the object service is not stopped, the processing is ended. On the other hand, if the object service is stopped, it is checked whether the class loader of the object service required for executing the object service is registered in the class loader management portion 203 or not (step S605).

If the class loader of the object service required for executing the object service is not registered in the class loader management portion 203, a class loader for the object service is produced. The produced class loader acquires a storing location of the program data from the class path information management portion 202, loads the file of the program data from the external storing device 105, starts the service (step S607) and registers the class loader produced in the step S607 in the class loader management portion 203 (step S608). If the class loader of the object service required for executing the object service is registered in the class loader management portion 203, the class loader of the object service is acquired from the class loader management portion and the service is started (step S606).

As mentioned above, according to the second embodiment of the present invention, by providing the service manager 101 as the application management program for managing the operations of the plural Java applications (services) operating on the Java virtual machine 107, the HTTP server 102 as the web server operating on the service manager 101, and the control servlet 104 operated as the servlet as one form of the Java program operating on the HTTP server 102, it is possible to easily add, operate or delete a program after the equipment is forwarded, without affecting execution of other Jave applications executed in the equipment such as the incorporated equipment, by installing the service into the equipment from the remote web browser 100, starting the service or stopping the service.

Further, by forming and managing the class loader for each service prepared in the Java in order to read the class data as the unit of the program data for individual service from the disk and to manage the read class data, increase of a vacant memory can easily be realized by avoiding interference between the service class names or by deleting the class loader from the memory.

That is to say, after the incorporated equipment such as a copying machine, a printer, a multi function printer (MFP) having copier, printer and facsimile functions and a digital camera is forwarded, it is possible to install the program into the incorporated equipment and to start the installed program, and, further, the memory of the incorporated equipment can be saved, and, further, installation, start/stop and uninstallation of the program itself for effecting the installation, start/stop and uninstallation can easily be performed.

(Third Embodiment)

Figure 7:
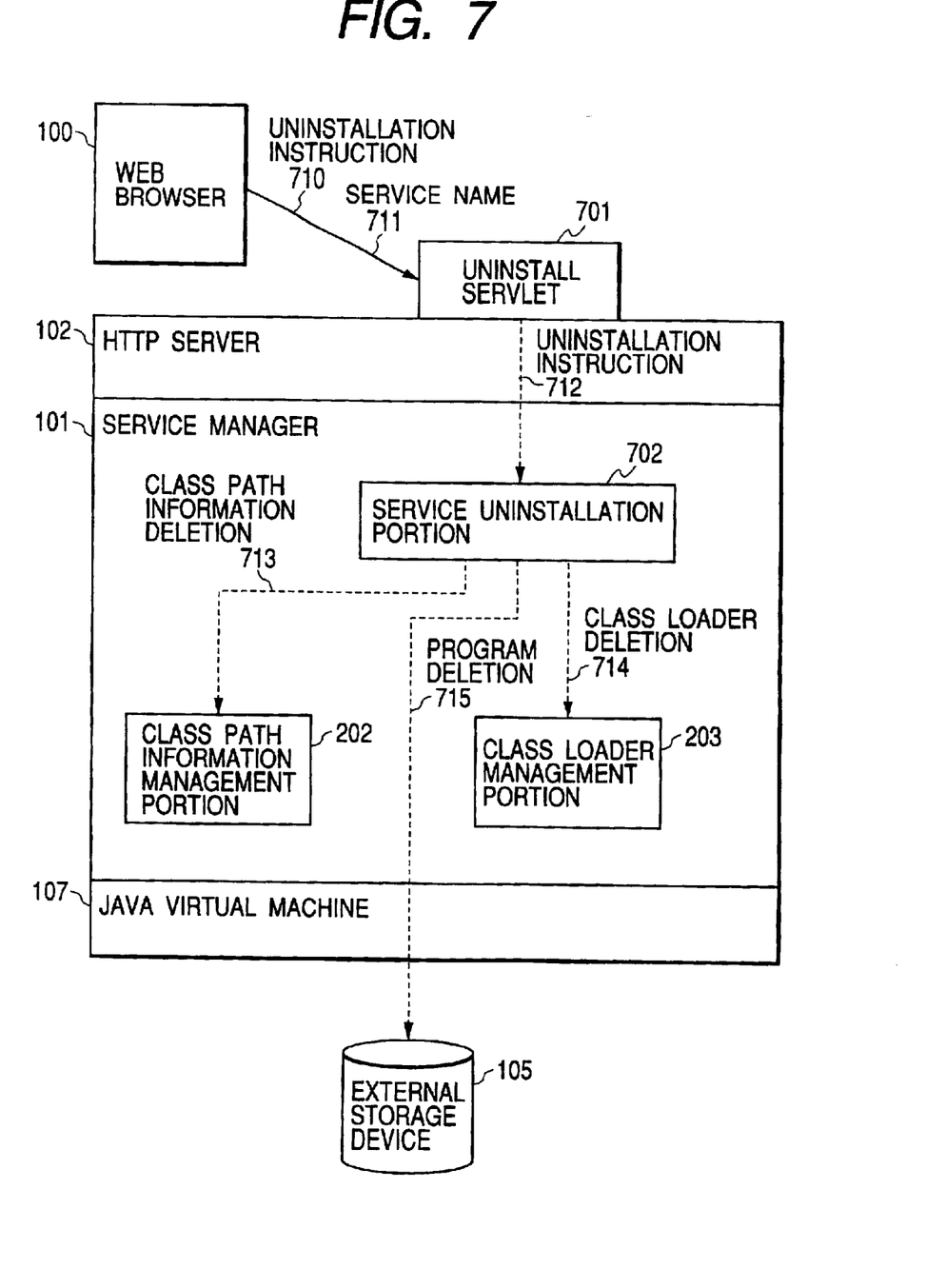
FIG. 7 is a block diagram showing a construction of an application managing system according to a third embodiment of the present invention.

FIG. 7 is a block diagram showing a construction of an application managing system according to a third embodiment of the present invention. The application management system comprises a Java virtual machine 107, a web browser 100 arranged at a user side where installation of Java application (referred to as "service" hereinafter) is effected, a service manager 101 for managing the service, an HTTP 102 executed as service on the service manager 101, an uninstall servlet 701 formed in the form of servlet as one style of a Java program executed on the HTTP server 102 and operating on the HTTP server 102 and adapted to effect uninstallation processing of the service, and an external storing device 105 in which the program to be installed is stored.

Further, the service manager 101 includes a service uninstallation portion 702 for effecting uninstallation processing of the service, a class path information management portion 202 for storing a pair comprised of a name of the service installed and a path information in which a program file of the service is stored, and a class loader management portion 203 in which a pair comprised of the service name and a class loader (for the started service) formed in the service start portion 201 when the service is started.

Next, an operation of the third embodiment of the present invention constructed as mentioned above will be fully explained with reference to FIGS. 7, 8 and 13.

Figure 8:
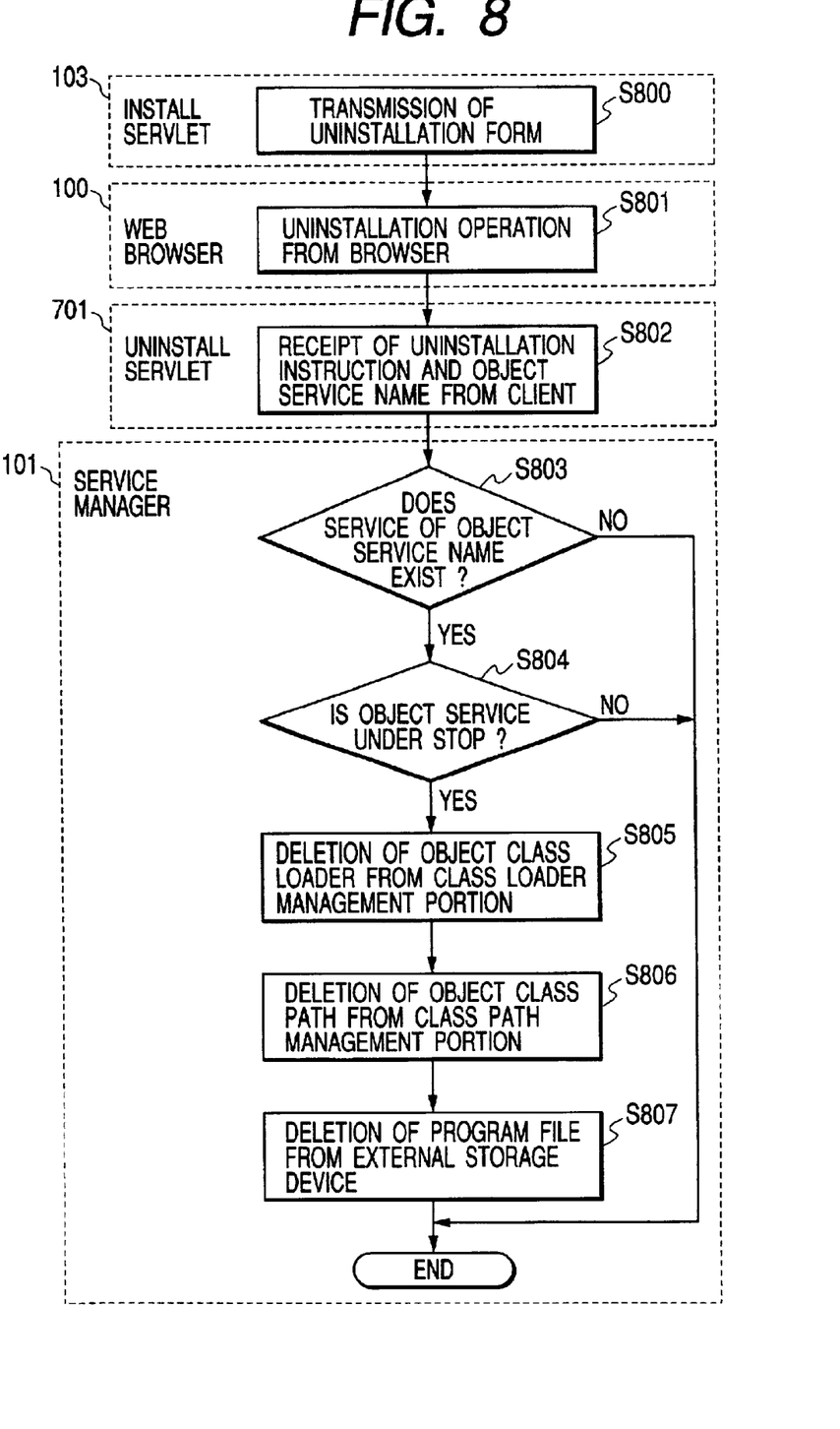
FIG. 8 is a flow chart showing uninstallation processing according to the third embodiment.
Figure 13:
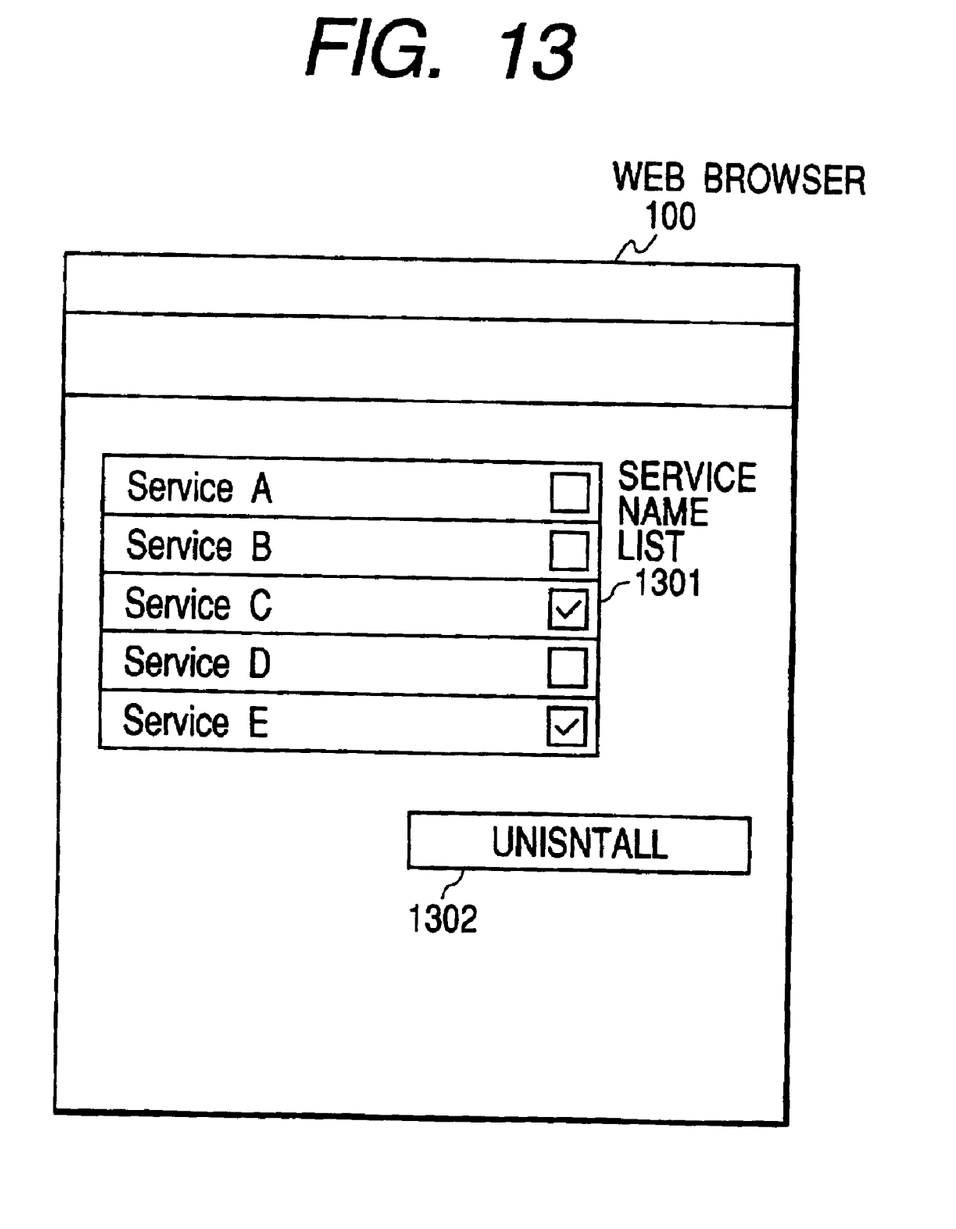
FIG. 13 is an explanatory view showing a service uninstallation screen according to the third embodiment.

First of all, as shown in FIG. 8, the uninstall servlet 701 operating on the HTTP server 102 which is one of services operating on the service manager 101 and adapted to effect the uninstallation processing of the service serves to send form data including a service name list 1301 comprised of the service name and a check box, and an uninstallation button 1302, on the basis of request from the web browser 100 (step S800), as shown in FIG. 13.

In the web browser 100, when the operator checks the check box of the service which is desired to be uninstalled by using the service name list 1301 of the form and depresses the uninstallation button 1302, in accordance with specification of the form defined by HTML, the service name 711 to be uninstalled is transferred from the web browser 100 to the uninstallation servlet 701 as uninstallation instruction 710 of the program by HTTP protocol (step S801).

When the service name 711 to be uninstalled is transferred from the web browser 100 as the uninstallation instruction 710 of the program (step S801), the uninstallation servlet 701 receives the uninstallation instruction 710 and the service name 711 (to be started) sent from the web browser 100 (step S802) and outputs uninstallation instruction 712 of the service to the service manager 101.

When the service uninstallation portion 702 of the service manager 101 receives the uninstallation instruction from the uninstallation servlet 701, the service uninstallation portion firstly checks whether the service name 711 is registered in the class path information management portion 202 (step S803). If there is no object service in the class path information management portion 202, the processing is ended. On the other hand, if there is the object service in the class path information management portion 202, then, it is checked whether the object service is stopped or not (step S804).

If the object service is not stopped, the processing is ended. On the other hand, if the object service is stopped, class loader deletion 714 of the object service from the class loader management portion 703 is effected (step S805). Further, after class path information deletion 713 of the object service from the class path information management portion 202 is effected (step S806), program file deletion 715 of the object service from the external storing device 105 is effected (step S807), and the processing is ended.

As mentioned above, according to the third embodiment of the present invention, similar to the first embodiment, after the incorporated equipment such as a copying machine, a printer, a multi function printer (MFP) having copier, printer and facsimile functions and a digital camera is forwarded, it is possible to install the program into the incorporated equipment and to start the installed program, and, further, the memory of the incorporated equipment can be saved, and, further, installation, start/stop and uninstallation of the program itself for effecting the installation, start/stop and uninstallation can easily be performed.

(Fourth Embodiment)

Figure 9:
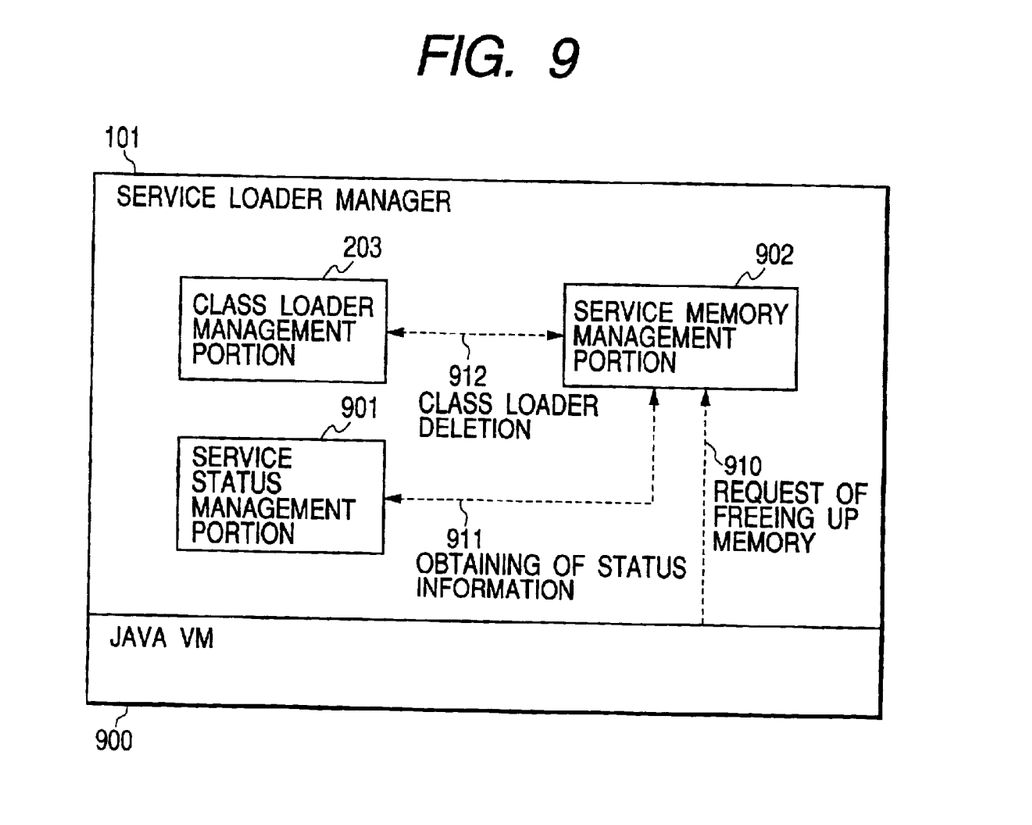
FIG. 9 is a block diagram showing a construction of an application managing system according to a fourth embodiment of the present invention.

FIG. 9 is a block diagram showing a construction of an application managing system according to a fourth embodiment of the present invention. The application management system comprises a Java virtual machine 900, and a service manager 101 for managing Java application (referred to as "service" hereinafter).

Further, the service manager 101 includes a service memory management portion 902 for managing the memory of the service, a service status management portion 901 for managing the installed service name and a execution status of the service, and a class loader management portion 203 for storing a pair comprised of the service name and a class loader (for the started service) formed in the service start portion when the service is started.

Next, an operation of the fourth embodiment of the present invention constructed as mentioned above will be fully explained with reference to FIGS. 9 and 10.

Figure 10:
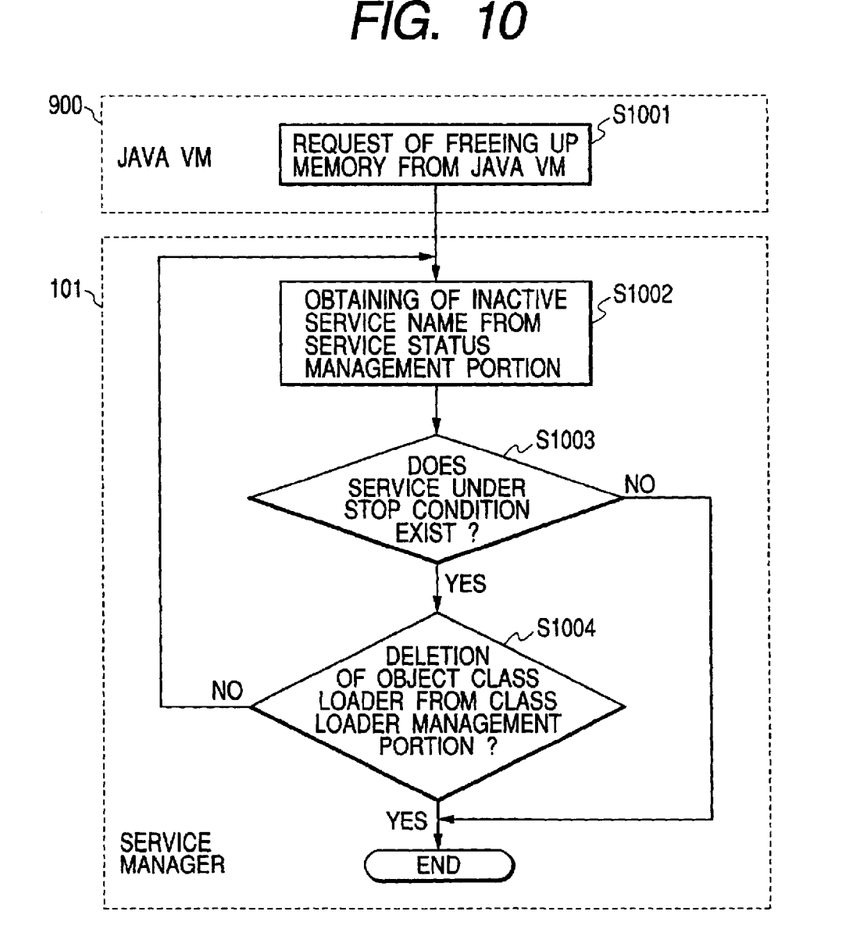
FIG. 10 is a flow chart showing memory management processing according to the fourth embodiment.

If the memory becomes insufficient during the execution of the Java program, as shown in FIG. 10, request 910 of freeing up memory is sent from the Java virtual machine 900 to the service memory management portion 902 of the service manager 101 (step S1001). The service memory management portion 902 obtains the name of the service which is not presently operated, from the service status management portion 901 (step S1002). The service status management portion 901 checks whether or not there is any service having stop status (step S1003).

If there is no service having stop status, the processing is ended. On the other hand, if there is the service having stop status, the class loader of said service is deleted from the class loader management portion 203 ("YES" in a step S1004), and the processing is ended. If the class loader of said service cannot be deleted from the class loader management portion 203 ("NO" in the step S1004), the processing is returned to the step S1002.

As mentioned above, according to the fourth embodiment of the present invention, similar to the first embodiment, after the incorporated equipment such as a copying machine, a printer, a multi function printer (MFP) having copier, printer and facsimile functions and a digital camera is forwarded, it is possible to install the program into the incorporated equipment and to start the installed program, and, further, the memory of the incorporated equipment can be saved, and, further, installation, start/stop and uninstallation of the program itself for effecting the installation, start/stop and uninstallation can easily be performed.

In the above-mentioned embodiments of the present invention, although the equipment to which the application management system is applied was not specified, the application management system can be applied to various incorporated equipments such as a copying machine, a printer, a multi function printer (MFP) having copier, printer and facsimile functions and a digital camera.

Incidentally, the present invention may be applied to a system including plural equipment and a system including a single equipment. It should be noted that the object of the present invention can be achieved by supplying a storing medium storing a program code of software for executing the functions of the above-mentioned embodiments to the system or apparatus and by reading out and executing the program code stored in the storing medium by means of a computer (or CPU or MPU) of the system or the apparatus.

In this case, the program code itself read out from the storing medium realizes the functions of the above-mentioned embodiments, and, thus, the storing medium storing such program code constitutes the present invention.

As the storing medium for supplying the program code, for example, a floppy disk, a hard disk, an optical disk, a photo-magnetic disk, CD-ROM, CD-R, a magnetic tape, a non-volatile memory card, ROM or download via a network can be used.

Further, it should be noted that the present invention includes a concept that not only the functions of the above-mentioned embodiments are realized by executing the program code read out by means of the computer, but also OS (operating system) running on the computer executes the actual processing partially or totally on the basis of instruction of the program code to realize the functions of the embodiments.

Further, it should be noted that the present invention includes a concept that, after the program code read out from the storing medium is written in a memory of a function expansion board inserted into the computer or a function expansion unit connected to the computer, a CPU of the function expansion board or of the function expansion unit executes the actual processing partially or totally on the basis of instruction of the program code to realize the functions of the embodiments.

As mentioned above, according to the application management system of the embodiment, when the program file is sent from the client, the program file is stored in the external storing device, and the positional information of the program file is registered in the storing means.

Further, when the stop instruction of the application is sent from the client, the stop-instructed application is stopped, and, when the start instruction of the application is sent from the client and if the class loader of the start-instructed application is not registered in the registration means, the class loader for the application is formed, the application is started, the formed class loader is registered in the registration means, and the class is loader by the formed class loader; whereas, if the class loader of the start-instructed application is registered in the registration means, the registered class loader is acquired, the class is loaded by the acquired class load, and the application is started.

Further, when the uninstallation instruction and the name of the application to be uninstalled are sent from the client, the program file corresponding to the application name is deleted from the external storing device, and entry corresponding to the application name is deleted from the registration means and the storing means.

As a result, after the incorporated equipment such as a copying machine, a printer, a multi function printer (MFP) having copier, printer and facsimile functions and a digital camera is forwarded, it is possible to install the program into the incorporated equipment and to start the installed program. Further, the memory of the incorporated equipment can be saved by deleting the class loader of the program not used from the memory. Further, since the program for effecting the installation, start/stop and uninstallation is the program operating on the application management program, installation, start/stop and uninstallation of the program itself for effecting the installation, start/stop and uninstallation can easily be performed.

Further, also in the application management method of the present invention, the storing medium of the present invention and the program of the present invention, similar to the above, after the incorporated equipment is forwarded, it is possible to install the program into the incorporated equipment and to start the installed program.

What is claimed is:

1. An application managing apparatus for managing an application operating on a virtual machine in an equipment, comprising:

registration means for registering a class loader of the application;

storing means for storing a storing location of a program file of the application;

network connecting means for effecting communication to a client; and start means for forming a class loader for the application, starting the application, registering the formed class loader in said registration means and loading the class by means of the formed class loader when a start instruction for the application is sent from said client through said network connecting means, and if the class loader for the start-instructed application is not registered in said registration means, for obtaining the class loader registered in said registration means, loading the class by means of the obtained class loader and starting the application if the class loader for the start-instructed application is registered in said registration means.

2. An application managing apparatus according to claim 1, further comprising deletion control means for deleting the program file corresponding to a name of the application from a storing device in which the program file is stored and for deleting an entry corresponding to the name of the application from said registration means and said storing means, when an uninstallation instruction and the name of an object application to be uninstalled are sent from said client through said network connecting means.

3. An application managing apparatus according to claim 2, wherein said deletion control means includes a deletion control application which is one of applications operating on said application managing apparatus.

4. An application managing apparatus according to claim 1, further comprising stop means for stopping a stop-instructed application when an application stop instruction is sent from said client through said network connecting means.

5. An application managing apparatus according to claim 4, further comprising status management means for managing an execution status of the application, and wherein, if a memory required for the execution of the application becomes insufficient, the class loader of the application stored in said status management means as being a stop condition is deleted from said registration means.

6. An application managing apparatus according to claim 1, wherein said start means includes a start application which is one of applications operating on said application managing apparatus.

7. An application managing method for managing an application operating on a virtual machine in an equipment, comprising:

a registration step for registering a class loader of the application in a registration means;

a storing step for storing a storing location of a program file of the application in a storing means; and a starting step for forming the class loader for the application, starting the application, registering the formed class loader in said registration means and loading the class by means of the formed class loader when a start instruction for the application is sent from a client through a network connecting means, and if the class loader for the start-instructed application is not registered in said registration means, for obtaining the class loader registered in said registration means, loading the class by means of the obtained class loader and starting the application if the class loader for the start-instructed application is registered in said registration means.

8. An application managing method according to claim 7, further comprising a deletion control step for deleting the program file corresponding to a name of the application from a storing device in which the program file is stored and for deleting an entry corresponding to the name of the application from said registration means and said storing means, when an uninstallation instruction and the name of an object application to be uninstalled are sent from said client through said network connecting means.

9. An application managing method according to claim 8, wherein said deletion control step includes a deletion control application which is one of applications operating on an application managing apparatus.

10. An application managing method according to claim 7, further comprising a stop step for stopping a stop-instructed application when an application stop instruction is sent from said client through said network connecting means.

11. An application managing method according to claim 10, further comprising a status management step for managing an execution status of the application, and wherein, if a memory required for the execution of the application becomes insufficient, the class loader of the application stored in said status management step as being a stop condition is deleted from said registration means.

12. An application managing method according to claim 7, wherein said start step includes a start application which is one of applications operating on an application managing apparatus.

13. A storing medium for storing an application management program for managing an application operating on a virtual machine in an equipment, comprising:

a registration step for registering a class loader of the application in a registration means;

a storing step for storing a storing location of a program file of the application in a storing means; and a starting step for forming the class loader for the application, starting the application, registering the formed class loader in said registration means and loading the class by means of the formed class loader when a start instruction for the application is sent from a client through a network connecting means, and if the class loader for the start-instructed application is not registered in said registration means, for obtaining the class loader registered in said registration means, loading the class by means of the obtained class loader and starting the application if the class loader for the start-instructed application is registered in said registration means.

14. A computer-readable program for controlling a computer to manage an application operating on a virtual machine in an equipment, said program comprising codes for causing the computer to perform the steps of:

a registration step for registering a class loader of the application in a registration means;

a storing step for storing a storing location of a program file of the application in a storing means; and a starting step for forming the class loader for the application, starting the application, registering the formed class loader in said registration means and loading the class by means of the formed class loader when a start instruction for the application is sent from a client through a network connecting means, and if the class loader for the start-instructed application is not registered in said registration means, for obtaining the class loader registered in said registration means, loading the class by means of the obtained class loader and starting the application if the class loader for the start-instructed application is registered in said registration means.

* * * * *